United States Patent Office 3,749,786
Patented July 31, 1973

3,749,786
ORGANIC COMPOUNDS IN TREATING
ALLERGIC CONDITIONS
Jean-Pierre Bourquin, Magden/AG, Gustav Schwarb,
Allschwil, and Erwin Waldvogel, Aesch, Switzerland,
assignors to Sandoz Ltd., Basel, Switzerland
No Drawing. Continuation-in-part of application Ser. No.
120,738, Mar. 3, 1971, now Patent No. 3,682,930,
dated Aug. 8, 1972. This application Aug. 7, 1972,
Ser. No. 278,244
Claims priority, application Switzerland, Mar. 11, 1970,
3,598/70; July 31, 1970, 11,593/70
Int. Cl. A61k 27/00
U.S. Cl. 424—267       7 Claims

ABSTRACT OF THE DISCLOSURE

The present invention concerns a novel method of treating allergic conditions, which comprises administering an effective dose of a histaminolytic of the formula:

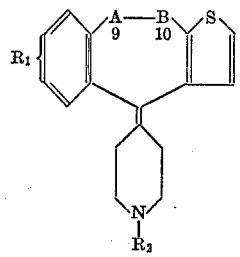

wherein $R_1$ is hydrogen, halogen or alkoxy of 1 to 4 carbon atoms, $R_2$ is alkyl of 1 to 4 carbon atoms, and —A—B— is —$CH_2$—CO— or —CO—$CH_2$—, or a pharmaceutically acceptable acid addition salt thereof.

---

This application is a continuation in part of copending application No. 120,738, filed Mar. 3, 1971, now U.S. 3,682,930 issued Aug. 8, 1972. The invention relates to a novel method of treating allergic conditions.

The present invention provides a method of treating allergic conditions, which comprises administering a therapeutically effective dose of a histaminolytic of Formula I,

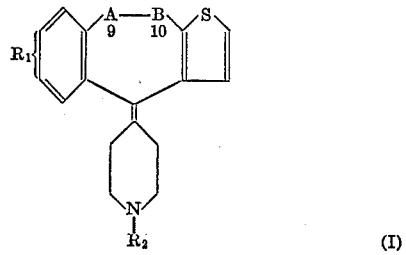

wherein $R_1$ is hydrogen, halogen, or alkoxy of 1 to 4 carbon atoms,
$R_2$ is alkyl of 1 to 4 carbon atoms, and
—A—B— is the group —$CH_2$—CO— or —CO—$CH_2$—, or a pharmaceutically acceptable acid addition salt thereof.

The compounds were tested in guinea pigs in the following tests:

Histamine toxicity test: male and female guinea pigs having a weight of 200 to 500 g. are utilized as test animals. The compound to be tested is administered subcutaneously to the animals at various dosage levels. Three hours later 20 mg./kg. of histamine dihydrochloride are administered subcutaneously. In the event of the guinea pigs surviving 12 hours after the application of the histamine, they are considered as being protected. The results obtained at the various dosage levels are transferred onto paper and the $ED_{50}$ value is ascertained in the usual manner.

Acetylchloline toxicity test: male and female guinea pigs having a weight of 200 to 500 g. are utilized as test animals. The compound to be tested is administered subcutaneously to the animals at various dosage levels. 30 minutes later 160 mg./kg. of acetylcholine chloride are administered subcutaneously. In the event of the guinea pigs surviving 12 hours after the application of the acetylchloline, they are considered as being protected. The results obtained at the various dosage levels are transferred onto graph paper and the $ED_{50}$ value is ascertained in the usual manner.

Serotonin toxicity test: male guinea pigs having a weight of 200 to 500 g. are utilized as test animals. The compound to be tested is administered subcutaneously to the animals at various dosage levels. Three hours later 75 mg./kg. of serotonin creatinine sulfate are administered intravenously (via the penis vein). In the event of the guinea pigs surviving 12 hours after the application of the serotonin, they are considered as being protected. The results obtained at the various dosage levels are transferred onto graph paper and the $ED_{50}$ value is ascertained in the usual manner.

From the above tests it was shown that compounds of Formula Ia.

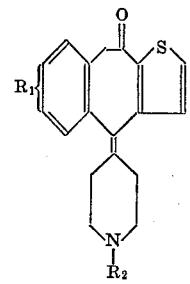

wherein $R_1$ and $R_2$ are as defined above.

are useful as specific histaminolytics, as indicated by their showing significant histaminolytic properties in the histamine toxicity test in guinea pigs, without showing any significant serotonin-antagonistic or anticholinergic properties in the serotonin and acetylcholine toxicity tests in guinea pigs. Particularly pronounced histaminolytic properties are observed with compounds of Formula Ia, wherein $R_2$ is methyl, notably 4-(1-methyl-4-piperidylidene)-4H - benzo[4,5]cyclohepta[1,2 - b]thiophen-10(9H)-one and 6 - chloro - 4-(1-methyl-4-piperidylidene)-4H-benzo[4,5]cyclohepta[1,2-b]thiophen-10(9H)-one.

It was also shown that compounds of Formula Ib,

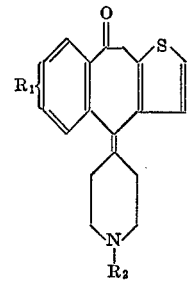

wherein $R_1$ and $R_2$ are as defined above, are useful antaminics, i.e. they are useful in antagonizing the effects of each of the biogenic amines histamine, serotonin and acetylcholine, as indicated by the above mentioned toxicity tests in guinea pigs.

The dose of the histaminolytic compound to be administered in the method will naturally vary depending on the compound employed, the mode of administration and the treatment desired. However, the doses are similar for compounds of Formula Ia and compounds of Formula Ib, and satisfactory results for each group of compounds are obtained at doses between abut 0.004 mg./kg. and 0.15 mg./kg. animal body weight. For the larger mammals, the daily dose is from about 0.25 to about 10 milligrams of the compound, which may be administered in divided doses 2 to 3 times a day or in sustained release form. Unit dosage forms suitable for oral administration incorporate from about 0.1 to about 5 milligrams of the compound, in association with a pharmaceutical carrier or diluent.

The compounds of Formula I may be administered in pharmaceutically acceptable acid addition salt form. Such salts possess the same order of activity as the free bases and are readily prepared in conventional manner. Suitable such salt forms include mineral acid salts such as the hydrochloride, hydrobromide and sulphate, and organic acid salts such as the fumarate, maleate, tartrate, methane-, ethane- and benzene-sulphonate, citrate and malate.

A compound of Formula I is obtained by a process comprising:

(a) Hydrolyzing a compound of Formula II,

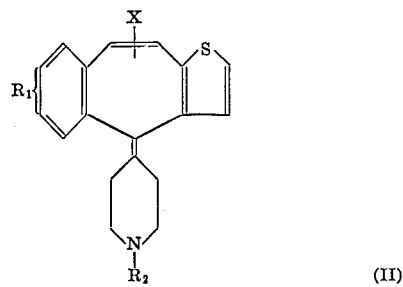

wherein $R_1$ and $R_2$ are as defined above, and X is in the 9 or 10 position and is an —OR radical, wherein R is alkyl of 1 to 4 carbon atoms, a radical of Formula III,

wherein $R_3$ is hydrogen or alkyl of 1 to 4 carbon atoms, and
$R_4$ is hydrogen or alkyl of 1 to 4 carbon atoms which is unbranched on the $\alpha$ carbon atom, or
$R_3$ and $R_4$, together with the nitrogen atom, form a saturated 5- or 6-membered heterocyclic ring, the heterocycle being selected from the group of heterocycles containing 1 or 2 nitrogen atoms, 1 nitrogen atom and a further hetero atom selected from oxygen and sulphur, and 1 nitrogen atom and one nitrogen atom substituted by an alkyl radical of 1 to 4 carbon atoms, (b) Alkylating a compound of Formula IV,

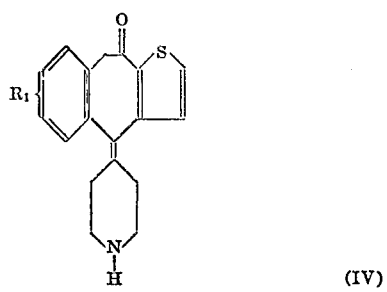

wherein $R_1$ is as defined above, to obtain a compound of Formula Ia,

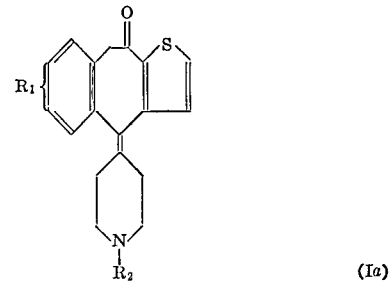

wherein $R_1$ and $R_2$ are as defined above.

The resulting compound of Formula I may be isolated in the form of a free base or as an acid addition salt thereof.

Particularly suitable $R_1$ radicals are hydrogen, chlorine, bromine and methoxy.

The symbol X in Formula II is suitably the tert.butoxy group, the dimethylamino, diethylamino or n-butylamino radical, and when X denotes a heterocycle, it may be, e.g., the piperidine, piperazino, morpholino, pyrrolidino or N-methyl-piperazino radical.

The term "inert solvent" as used herein signifies an organic solvent which is inert under the reaction conditions.

The production of compounds of Formula I in accordance with process variant (a) may, for example, be effected by heating compounds of Formula II in an aqueous acid solution. The reaction temperature is not critical. A suitable reaction temperature is approximately 50° to 100° C.; the reaction is preferably effected at the reflux temperature of the reaction mixture.

Suitable acids are aqueous inorganic acids, e.g. hydrochloric, sulphuric or phosphoric acid, and aqueous organic acids, e.g. formic, acetic, fumaric or oxalic acid.

The hydrolysis may also be carried out by hydrolyzing a mixture of compounds of Formula II substituted in the 9 position with corresponding compounds of Formula II substituted in the 10 position. Such hydrolysis results in a mixture of isomers of Ia and Ib, as shown above, and said isomers may be separated in conventional manner, for example by fractional crystallization of a salt, e.g., a fumarate, to give the desired isomer.

Alkylation of the compounds of Formula IV in accordance with process variant (b) may be effected in accordance with known methods, e.g. by treatment with alkyl halides, with esters of organic sulphonic acids, e.g. methane-, benzene- or p-toluene-sulphonic acid, or with dialkyl sulphates, in an inert solvent and in the presence of a basic condensation agent.

The compounds of Formula I may be isolated from the worked up reaction mixture in conventional manner, e.g. chromatographically.

The compounds of Formula II are likewise new.

Compounds of Formula IIa,

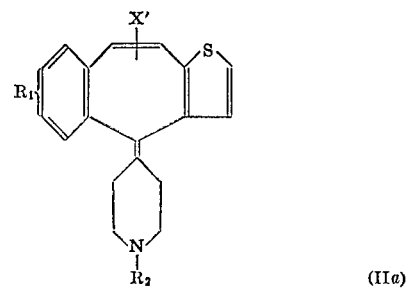

wherein $R_1$ and $R_2$ are as defined above, and X' is in the 9 or 10 position and is a radical of Formula III, may, for example, be obtained by reacting a compound of Formula V,

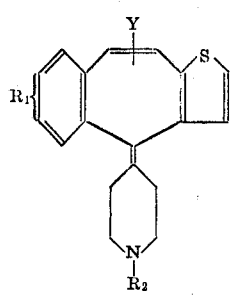

(V)

wherein $R_1$ and $R_2$ are as defined above, and

Y is chlorine or bromine in the 9 or 10 position, or a mixture of a compound of Formula V substituted in the 9 position, with a compound of Formula V substituted in the 10 position, in the presence of an acid-binding agent, e.g. an alkali metal amide or hydride or a potassium alcoholate, e.g. a potassium tert.butylate, with the corresponding amine or saturated, nitrogen-containing heterocycle.

This reaction yields a mixture of compounds of Formula IIa substituted in the 9 position, with compounds of Formula IIa substituted in the 10 position. A separation may be effected in accordance with known methods, but is not necessary; the worked up mixture is generally further worked up as such.

Compounds of Formula IIb,

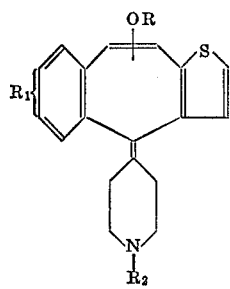

(IIb)

wherein R, $R_1$ and $R_2$ are as defined above, may be produced by reacting compounds of Formula V with a potassium alcoholate, preferably an excess of the same, if desired in an inert organic solvent, e.g. a cyclic or open chain ether such as dioxane. The reaction is preferably effected at room temperature or at a slightly elevated temperature.

This reaction likewise yields a mixture of the compounds of Formula IIb substituted in the 9 position, with the compounds of Formula IIb substituted in the 10 position, which mixture is generally not separated, but further worked up after working up the reaction mixture.

The compounds of Formula IV may, for example, be obtained by dealkylation of compounds of Formula Ia in accordance with known methods. For example, compounds of Formula Ia are treated with a cyanogen halide, preferably cyanogen bromide, or a halogen formic acid ester. In this reaction the radical $R_2$ is first replaced by the cyano or alkoxycarbonyl group. The reaction is conveniently effected in an inert organic solvent, e.g. an open chain or cyclic ether such as diethyl ether or tetrahydrofuran, an aromatic hydrocarbon such as benzene, a chlorinated aliphatic hydrocarbon such as methylene chloride, and at a reaction temperature between room temperature and the boiling temperature of the reaction mixture. The cyano or alkoxy-carbonyl group is subsequently split off in accordance with known methods, e.g. by acid hydrolysis.

The compounds of Formula V, which are likewise new, may be obtained by dehydrating a compound of Formula VI,

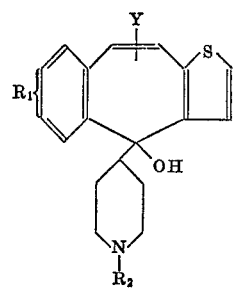

(VI)

wherein $R_1$, $R_2$ and Y are as defined above.

The removal of water, may, for example, be effected with a mineral acid such as hydrochloric acid in ethanol, or with a strong organic acid, acetic anhydride or an inorganic acid halide as water-removing agent. However, the reaction is preferably effected with hydrobromic acid in an inert organic solvent, e.g. a lower alcohol.

Compounds of Formula VI may, for example, be produced by adding dropwise a solution of a compound of Formula VII,

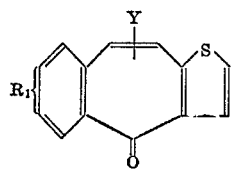

(VI)

wherein $R_1$ and Y are as defined above, in an inert organic solvent, e.g. an open chain or cyclic ether such as tetrahydrofuran or diethyl ether, to a magnesium organic halogen compound of Formula VIII,

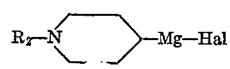

(VIII)

wherein $R_2$ is as defined above, and Hal signifies chlorine, bromine or iodine, in the same inert solvent in which it was prepared, conveniently stirring the reaction mixture for about 1½ hours, preferably at room temperature, and subsequently hydrolyzing. Hydrolysis may, for example, be effected with an aqueous ammonium chloride solution in the cold.

The compounds of Formula VII are likewise new and may, for example, be produced by chlorinating or brominating a compound of Formula IX,

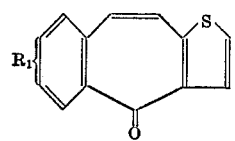

(IX)

wherein $R_1$ is as defined above, to obtain the corresponding 9,10-dichloro- or 9,10-dibromo compounds, and subsequently converting the resulting compounds into compounds of Formula VII under alkaline conditions, e.g. by reaction with a solution of potassium hydroxide in an inert organic solvent such as methanol, or, e.g., by heating with a commercial solution or sodium or potassium hydroxide in the presence of a lower alcohol solvent.

The above 9,10-dibromo compounds obtained from the compounds of Formula IX may, for example likewise be obtained by reacting a compound of Formula X,

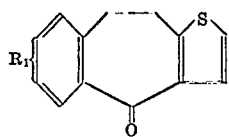

(X)

wherein $R_1$ is as defined above,
with the stoichiometric amount of N-bromosuccinimide in an inert organic solvent, e.g. a chlorinated aliphatic hydrocarbon such as carbon tetrachloride.

Insofar as the production of the starting materials is not described, the compounds are known or may be produced in accordance with known processes or in a manner analogous to the processes described herein or to known processes.

What is claimed is:
1. A method of treating allergic conditions, which comprises administering to an animal in need of such treatment a therapeutically effective dose of a histaminolytic of the formula:

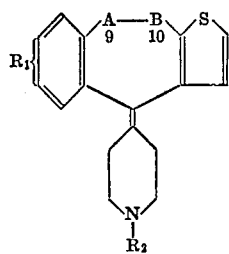

wherein $R_1$ is hydrogen, halogen or alkoxy of 1 to 4 carbon atoms, $R_2$ is alkyl of 1 to 4 carbon atoms, and —A—B— is —CH$_2$—CO— or —CO—CH$_2$—, or a pharmaceutically acceptable acid addition salt thereof.

2. A method of treating allergic conditions according to claim 1, wherein the histaminolytic is of the formula:

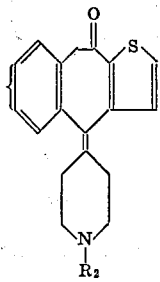

wherein $R_1$ and $R_2$ are as defined in claim 1, or a pharmaceutically acceptable acid addition salt thereof.

3. A method according to claim 1, in which the histaminolytic is administered in an amount of 0.004 to 0.15 mg./kg. animal body weight.

4. A method according to claim 2, in which the histaminolytic is administered in an amount of 0.004 to 0.15 mg./kg. animal body weight.

5. A method according to claim 4, in which the histaminolytic is 4-(1-methyl-4-piperidylidene)-4H-benzo[4,5]cyclohepta[1,2-b]thiophen-10(9H)-one or a pharmaceutically acceptable acid addition salt thereof.

6. A method according to claim 3, in which the histaminolytic compound is administered in an amount of 0.25 to 10 mg. per day.

7. A method according to claim 2, in which the histaminolytic is 4-(1-methyl-4-piperidylidene)-4H-benzo[4,5]cyclohepta[1,2 - b]thiophen - 10(9H) - one or a pharmaceutically acceptable acid addition salt thereof.

References Cited
UNITED STATES PATENTS 3,272,826  9/1966  Jucker et al. _____ 260—293.57
3,491,103  1/1970  Jucker et al. _____ 260—293.57

STANLEY J. FRIEDMAN, Primary Examiner

UNITED STATES PATENT OFFICE
CERTIFICATE OF CORRECTION

Patent No. 3,749,786     Dated July 31, 1973

Inventor(s) Jean-Pierre Bourquin, Gustab Schwarb, Erwin Waldvogel

It is certified that error appears in the above-identified patent and that said Letters Patent are hereby corrected as shown below:

Column 8 claim 2 lines 5 to 15 the structure should appear as follows.

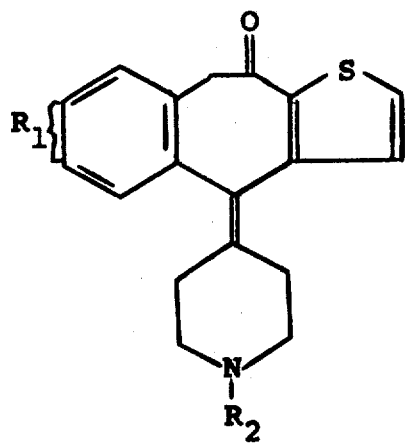

Signed and sealed this 11th day of June 1974.

(SEAL)
Attest:

EDWARD M. FLETCHER, JR.
Attesting Officer

C. MARSHALL DANN
Commissioner of Patents